March 2, 1943. H. E. MALONE 2,312,349
CONTROL DEVICE
Filed Oct. 3, 1940
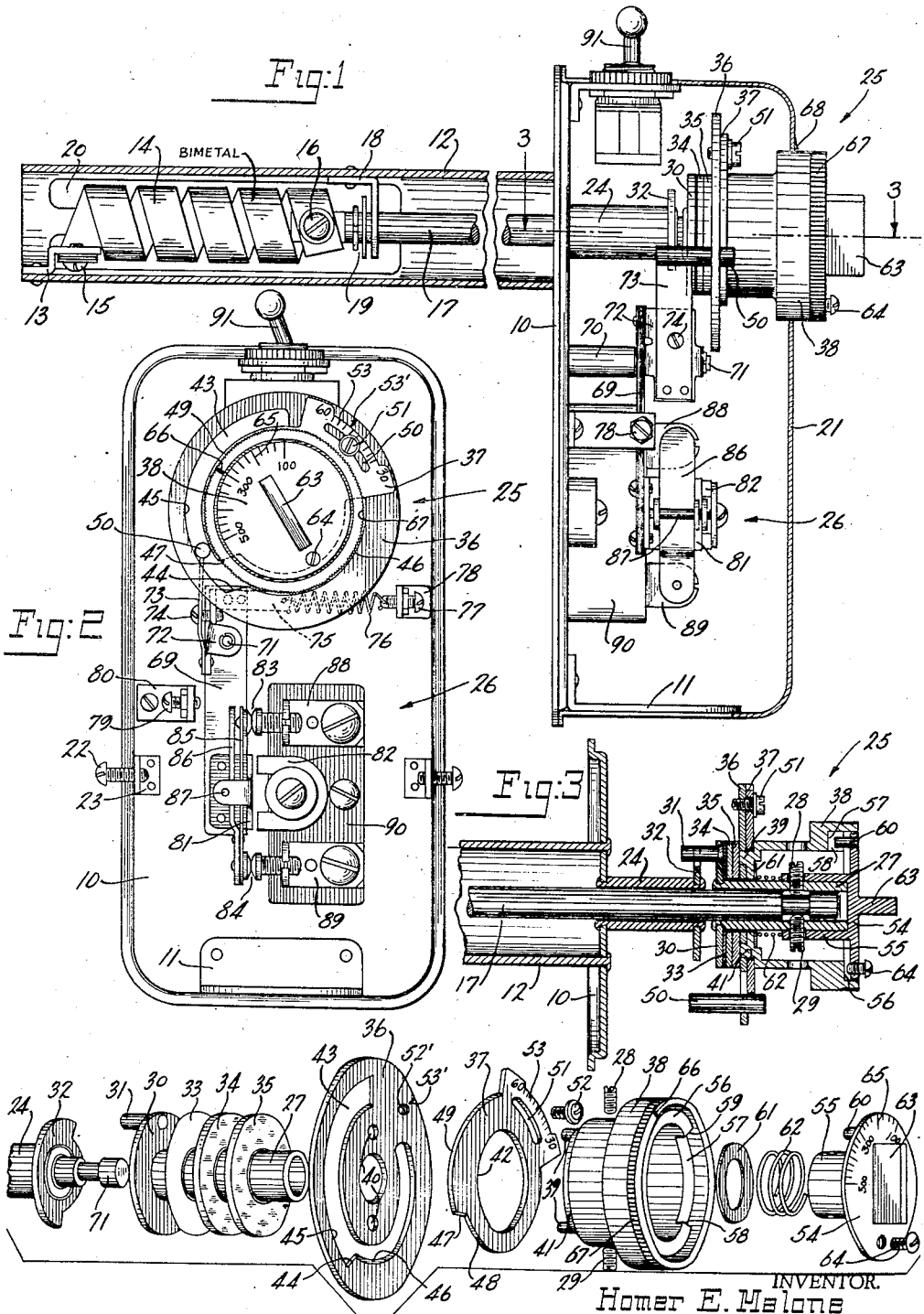
Fig:1
Fig:2
Fig:3
Fig:4
INVENTOR.
Homer E. Malone
BY
M. Gates ATTORNEY.

Patented Mar. 2, 1943

2,312,349

UNITED STATES PATENT OFFICE 2,312,349

CONTROL DEVICE

Homer E. Malone, Milwaukee, Wis., assignor to Perfex Corporation, Milwaukee, Wis., a corporation of Wisconsin Application October 3, 1940, Serial No. 359,509

16 Claims. (Cl. 200—138)

This invention relates in general to control devices and more particularly to automatic control devices for use in air conditioning systems. The general object of the invention is to provide an improved control device including electrical switching mechanism which is operative responsive to changes in temperature conditions.

In air conditioning systems it is customary to provide a heating plant or warm air furnace for heating the air in a space to a comfortable temperature and also to provide means for circulating the heated air. A room thermostat is usually provided to regulate the operation of the heating plant in accordance with the demand for heat, and in order to insure greater uniformity of the temperature of the space being warmed and also to guard against excessive abnormal temperatures in the furnace, it has been customary to supplement the room thermostat with a secondary control device such as a limit control switch. This limit control switch is arranged to respond directly to the temperature of the furnace and may be located upon a warm air duct or in the bonnet of the furnace. In order that the heated air may be forced or circulated to the space being heated, an additional control device is located in the furnace bonnet to permit the operation of the air circulating means only when the air has been heated to a predetermined value.

It is one of the principal objects of this invention to provide an improved control device for the foregoing purpose which will function to regulate the operation of a heating plant in a more reliable and satisfactory manner.

A further object of the invention is to provide a new and improved regulating and adjusting means in a control device for predetermining the temperature point at which the control device operates the switching elements.

Another object is to provide improved adjusting means for a control device in which the adjusting means is so arranged that temperature adjustments may be easily made exteriorly of the control device and without removal of the cover thereof.

An additional object is to provide means in a control device whereby the temperature adjustment is limited to a predetermined range of adjustment and whereby the adjusted setting may be locked from further movement.

Other objects and advantages of the improved control device reside in certain novel features of construction, arrangement and combination of the various elements which will be hereinafter more fully described, particularly pointed out in the appended claims and illustrated in the accompanying drawing in which:

Fig. 1 illustrates in side elevation and partly in section, a preferred embodiment of a control device incorporating the invention;

Fig. 2 is a front elevational view of the control device;

Fig. 3 shows a cross-sectional view of a portion of the control device taken along the line 3—3 of Fig. 1; while Fig. 4 is a view showing in extended and detached relationship, the various elements comprising the control operating portion of the device.

For the purposes of describing the invention it has been chosen to illustrate the same in the form of a limit control device in which the control device is adapted to function upon a rise in stack or bonnet temperature beyond a predetermined abnormal point, and as a result open its switching contacts to thereby shut down the heating plant.

Referring now particularly to the drawing, the control device includes a flat metal base plate 10 having a conduit attaching bracket 11 secured as shown to its lower end. A metal tubular member 12 projects rearwardly from the base plate 10 and is rigidly attached thereto at one end by a staking operation as shown in Fig. 3. By any well known means such as an adjustable flange not shown, the tube 12 serves to support the complete control device upon the bonnet or warm air duct of a furnace for example. The opposite free end of the tube projects into the duct or bonnet of a furnace and at its end carries a supporting bracket 13. A condition responsive means shown in the form of a coiled bimetallic helix or thermal element 14 is arranged axially within the tube 12 and is secured at one end to the bracket 13 by screw 15. The other end of the thermal element 14 is secured by a screw 16 to a rotatable shaft or torsion rod 17 which extends axially through the tube 12 and an opening in the base plate 10 to the front side thereof. A second supporting bracket 18 fastened to the tube 12 serves as a support and bearing for the torsion rod 17 at the point where it is connected with the thermal element 14. A washer 19 on the rod 17 prevents excessive longitudinal movement of the rod. In order that the thermal element 14 may be freely accessible to the warm air or gases within the furnace the portion of the tube 12 projecting into the furnace in the path of the air is provided with a number of longitudinal slots such as 20. With this arrangement the tube 12 also serves to physically protect the thermal element 14 from damage and excessive accumulation of dirt when in use. The torsion rod 17 is rotated in a clockwise direction by the thermal element 14 in conformity with rising changes in temperature to which the thermal element is subjected. A suitable metal cover 21 engaging the edges around the front of the base plate 10 serves to enclose and protect the control mechanism located on the front of the base 10. Cover holding screws 22 supported on the base 10 by brackets 23 serve to removably secure the cover 21 to the base. Projecting forwardly from the base plate 10 and secured thereto is a sleeve member 24 through which the rod 17 axially extends. This sleeve 24 serves as a bearing for the rod and a support for the operating end thereof.

The control operating and adjusting means indicated generally at 25 is arranged upon the front side of the plate 10 as a unit and is carried upon the free end of rod 17 for rotative operation thereby. The function of this control unit 25 is to actuate the switching mechanism indicated generally at 26, at predetermined temperature values in a manner to be pointed out hereinafter. The various elements of the control unit are carried upon a sleeve or hub member 27 which is mounted upon the free end of rod 17 and is securely fastened thereto by a pair of set screws 28 and 29 threaded into the hub 27 and engaging a reduced portion of the rod 17. Securely mounted upon the hub 27 is a disc member 30 having a stop pin 31 attached thereto which is adapted to engage the abutting ends of a disc member 32 when rotated within a range of about 180 degrees. The disc member 32 is rigidly secured to the bearing sleeve member 24 and serves as a stop to prevent excessive rotation of the unit 25.

The association of the various elements comprising the control means 25 are clearly illustrated in Fig. 4. Loosely positioned upon the hub member 27 are a number of friction elements comprising a paper washer 33 and a pair of fiber washers 34 and 35, the purpose of which will be hereinafter pointed out. Also loosely arranged upon the hub 27 is a pair of control operating or cam members 36 and 37 formed in the shape of flat plates, the cam member 37 being placed directly on top of the cam member 36. An adjusting member formed into the shape of a hollow adjusting knob 38 is likewise positioned loosely upon the hub 27 in front of cam member 36 and 37 and is provided with oppositely disposed pins 39 which are adapted to engage associated holes 40 in the cam member 36 so as to directly couple the cam member 36 with the adjusting member 38. A shoulder portion 41 formed on the cup member 38 provides a bearing surface for the periphery of an axial opening 42 in cam member 37 whereby the cam 37 may be rotatively positioned and supported thereon. The cam member 36 is provided with an arcuate slot 43 upon one side of which a cam operating surface 44 is formed. The outer peripheral edge of slot 43 constitutes an outer retaining surface 45 extending from one side of cam surface 44, and an inner retaining surface 46 extending from the opposite side of cam surface 44. Cam member 37 is provided with an opposing cam surface 47 and has an inner peripheral retaining surface 48 extending from one side of cam surface 47 and an outer retaining surface 49 extending from the other side of cam surface 47. The cam surfaces 44 and 47 are adapted to perform control operations by engaging a cam follower 50 connected to the switching mechanism 26. The cam follower 50 passes through the slot 43 and in the path of rotative movement of the cam surfaces 44 and 47. The cam surface 44 is adapted to move the follower 50 in one direction while the cam surface 47 is adapted to move the follower 50 in the opposite direction. After the cam follower 50 has been actuated by either cam surface 44 or 47 the cam members 36 and 37 can continue to rotate without straining the switching mechanism since the follower 50 rides in the slot 43 between either the inner retaining surfaces 46 and 48 or the outer retaining surfaces 45 and 49.

Means are provided for adjusting the differential operation of the follower 50 and therefore the switching mechanism 26 by the cams 36 and 37. This means comprises an arcuate slot 51 formed in the cam member 37, this slot receiving an adjusting screw 52. Adjusting screw 52 threads into a screw hole 52' in cam member 36 and clamps the member 37 directly against cam member 36 in any desired adjustable position within the limits of slot 51. Suitable cooperating indicia 53 on cam 37 and 53' on cam 36 serve to indicate the value of the differential adjustment. With this arrangement the cam members 36 and 37 may be rotatively shifted with respect to one another so that the distances between cam surfaces 44 and 47 may be adjusted to vary the differential operation.

Arranged upon the front end of rod 17 and positioned axially within the cup member 38 is a disc shaped holding member 54 having a shank portion 55 axially engaging the hub member 27 and held in position thereon by the set screws 28 and 29. The holding member 54 is positioned and slightly spaced opposite a shoulder portion 56 formed in the cup member 38. An inner shoulder portion 57 is formed within the cup member 38 so that the adjoining edges of the shoulders 56 and 57 provide abutting edges 58 and 59. These abutments 58 and 59 serve as limit stops for a pin 60 rigidly secured to the holding member 54. Disposed upon the hub member 27 is a thin washer 61 and a compression spring 62 which spring is arranged between the end of the shank 55 and the washer 61 so as to exert a compressive effort against the inner wall of the cup member 38. The spring 62 frictionally clamps the cam member 36 through the medium of friction washers 33, 34 and 35 against the disc member 30 rigidly mounted on the hub 27. The frictional effort of the spring 62 enables the control operating unit 25 to effect the actuating movement of the follower 50 without slipping while permitting manual temperature adjustments to be performed.

Formed integrally upon the front surface of holding member 54 is a finger piece 63 used in performing temperature adjusting operations. A locking screw 64 threads through the holding member 54 and is adapted to engage the shoulder 56 and thereby prevent relative movement between the adjusting member 38 and holding member 54 in order to lock the control in any predetermined adjusted setting. Suitable temperature indicating indicia 65 as shown is stamped upon the front of holding member 54 and cooperates with a marking 66 stamped upon the front edge of adjusting member 38. The outer peripheral surface of the adjusting member 38 is provided with a knurled edge 67 and the member 38 is so arranged that the knurled surface 67 protrudes through an opening in the cover 21 where it is manually accessible for manipulation together with the finger piece 63 to facilitate the performance of temperature adjustments on the control device. In order to indicate visually at all times the temperature to which the bimetal element 14 is subjected, an indicator 68, see Fig. 1, is arranged upon the front of the cover 21 directly above the edge of the adjusting member 38 and this cooperates with the indicating scale 65 on holding member 54 to indicate the bimetal temperature.

The control means or switching mechanism indicated generally at 26 is arranged to be actuated with snap action by the operation of the cam follower 50. This mechanism includes a switch operating lever 69 preferably made of insulation material which is pivoted at a point between its ends by a spacing sleeve 70 and a pivot pin 71 passing through the sleeve 70 and fastened at its bottom end to the base 10. An irregular shaped bracket 72, fastened to the switch lever 69, has a pair of ear shaped portions engaging the pivot 71 and provides a support for securing one end of a thin spring member 73, the opposite end of which carries the cam follower 50. In order to properly calibrate and center the cam follower 50 within the slot 43, a calibrating screw 74 passes through the thin leaf spring 73 and is threaded into the bracket 72. The switching mechanism is actuated with magnetic snap action as will be pointed out and in order to bias it in the opposite direction a spring means 76 is provided. This biasing spring 76 is attached at one end to an extension 75 of bracket 72. The other end of spring 76 is connected to an adjustable screw 77 carried on a bracket 78 secured to the base 10. By adjusting the screw 77 the proper amount of tension in biasing spring 76 may be provided to balance the magnetic effort and hold the switching mechanism in one of its positions. A stop is provided to prevent too great a movement of the switch arm 69 in open direction. This stop includes an adjustable screw 79 carried on a bracket 80 in turn secured to the base 10.

The magnetic snap acting means for operating the switching mechanism is preferably of the type disclosed in Patent 2,189,653, issued February 6, 1940, to J. K. Luthe, and includes a magnetic armature 81 having a bracketed extension thereon whereby the same may be supported from the lower end of switch arm 69 in the manner disclosed in Fig. 1. A U-shaped magnet 82 is arranged on the base 10 with its pole faces disposed in operative relation to the armature 81 for influencing the same. The contact structure for closing an electrical circuit includes associated pairs of movable and fixed contacts 83 and 84. The movable contacts are pivotally carried upon a spring blade 85 and a relatively stiff bar 86 which is pivoted to the armature bracket 81 by the pivot pin 87. The spring blade 85 and bar 86 carrying the movable contacts, act as bridging members to complete the electrical circuit in series with the fixed contacts when the contacts are closed. The fixed contacts are supported upon bracket members 88 and 89 which are carried upon an insulating block 90 suitably supported from the base 10 as shown and which also supports the magnet 82. The magnetic snap action arrangement pointed out effects quick opening and closing of the sets of contacts 83 and 84. The detailed manner in which these contacts are actuated with snap action is disclosed in greater detail in the aforesaid patent and therefore need not be further explained.

In the assembly of the control device the control mechanism 25 is pre-assembled upon the hub 27 as a unitary structure separate from the remaining parts of the control device. In this manner the various elements comprising the unit 25 may be more readily assembled and adjusted with respect to one another. The complete unit 25 is placed over the end of the rod 17 so that the follower 50 passes through the slot 43. The instrument is then calibrated at a known temperature by adjusting the disc 54 relative to the bimetal element 14 so that the indicated temperature corresponds to known temperature, after which the set screw 28 and 29 may be turned in tightly against the reduced portion of the rod 17 to thereby securely fasten the unit 25 upon the end of rod 17. As a limit control the device is usually adjusted to actuate the switching mechanism somewhere within a temperature range of 250 degrees and 300 degrees. Assume the control is to operate the switching mechanism at 300 degrees and that an adjustment for this temperature is to be made. Since the adjusting member 38 and the finger piece 63 protrude from the outside of the casing 21 and thereby are readily accessible for manual manipulation, a temperature adjustment may be readily performed without removing the cover or disturbing the interior mechanism including the switching mechanism 26, in any manner. In making a temperature adjustment it is merely necessary for the operator to grasp the finger piece 63 with one hand and then with the other hand grasp the knurled portion 67 of the adjusting member 38 and rotate this member 38 either in a clockwise or counterclockwise direction until, in the assumed instance, the designation 300 on the scale plate 54 is positioned directly opposite the marking 66 on the rim of the adjusting member 38. At this adjusted temperature of 300 degrees the thermal element 14 will function to effect the opening of the switching contacts 83 and 84. As the adjusting member 38 is rotated it carries along with it the cam members 36 and 37 and moves these against the frictional resistance of the washers 33, 34 and 35 while the rod 17 is held from movement by the finger piece 63. The frictional resistance of these friction washers is ordinarily sufficient to prevent any accidental displacement of the cam members.

In the automatic operation of the control device when the bimetal element 14 is subjected to a temperature rise to 300 degrees it rotates the rod 17 in a clockwise direction and at the particular adjusted setting the cam surface 44 engages the cam follower 50, thereby forcing it to move in a right hand direction so as to move the switch arm 69 about pivot 71. The cam follower 50 is then snapped to the other side of the circular slot 43 to a position between the retaining surfaces 46 and 48 and it can continue to ride within this portion of the slot as the bimetal element 14 encounters higher temperatures and further rotates the cam members. The switching mechanism as a result is not strained or the spring 73 buckled. The action of pivoting the switch arm 69 effects the opening of the sets of contacts 83 and 84 with snap action and when a point is reached in the separation of the contacts in which the magnet 82 can no longer exercise its magnetic influence over the armature 81, the tension spring 76 is effective to continue the opening movement until the stop 79 is engaged by the switch arm 69. The spring 76 thereupon holds or biases the contacts in their open position. The opening of the electrical circuit passing through the contacts 83 and 84 is effective in the use of the control device as a limit control to shut down the operation of the heating plant, for example, thereby reducing the temperature to which the thermal element 14 is exposed. The temperature point at which the control mechanism again closes the contacts, in other words the temperature difference between the cut-out point and the cut-in point, is determined by the associated positions of the cam surfaces 44 and 47. This differential operation is readily adjusted by loosening the screw 51, rotating the cam member 37 about the shoulder 41 on adjusting member 38 until the desired differential as indicated by scale markings 53 is provided, whereupon the screw 51 is again tightened.

When the bimetal element 14 has cooled sufficiently to the point where the cut-in operation is approached, the cam surface 47 engages cam follower 50. As the cam members continue to rotate this causes the follower 50 to be snapped in a counter-clockwise direction about pivot 71 so that it assumes the position in slot 43 indicated in Fig. 2. The switch arm 69 is moved so as to carry the armature 81 within the influence of magnet 82 until the contacts 83 and 84 close with snap action. The coil spring 76 is stretched at this time to store biasing tension therein.

The exact temperature to which the thermal element 14 is exposed may at all time be readily perceived from outside the casing 21 by noting the position of the scale markings 65 on the disc 54 with respect to the indicator 68 upon the cover 21. Since the stop pin 60 on indicating disc 54 engages the abutments 58 and 59 on cup member 38 at either extreme position, it is seen that adjustment of the temperature point at which the adjusting member 38 may be rotated is limited within the temperature range indicated by indicia 65. This prevents undue strain upon the bimetal 14 and prevents an adjustment beyond the limits for which the control device is constructed. Under certain conditions it is desirable that the adjusted temperature value of the control device be arranged so that it cannot be again moved after having once been set. The screw 64 threaded through indicating disc 54 onto shoulder 56 enables the temperature setting to be locked from further movement. The provision of the stop pin 31 engaging the abutting edges of disc 32 prevents rotation of the cam discs 36 and 37 by the bimetal element 14 to a point where the follower 50 would engage the ends of slot 43 and thereby strain or bend the same. The stop pin 31 effectively prevents this. This feature also prevents damaging of the instrument by mishandling of the adjusting mechanism.

While the embodiment of the invention has been disclosed in the form of a limit control switch it is readily applied to a warm air fan control device for example. To do this it is merely necessary to substitute a reversed form of bimetal thermal element 14 for the one disclosed and reverse the position of each of the cam members 36 and 37 on the hub 27. The switching mechanism will now be actuated to close the contacts 83 and 84 when the bimetal element 14 is subjected to a temperature rise at a predetermined point, and the contacts opened when the temperature drops. This action might be utilized to stop and start the operation of a circulating fan in the heating system for example. In some cases it may be desirable to operate the burner, fan or other device controlled by the instrument, or to prevent operation thereof, irrespective of the temperature at the instrument. For this purpose a manual snap switch 91 is provided which is mounted at the top end of the base 10 which may be suitably connected with contacts 83 and 84.

It is conceivable that some changes may be made in the construction and arrangement of the parts of the disclosed control device without departing from the real spirit and purpose of the invention, and it is the intention therefore to cover by the claims any modified forms of structure or use of mechanical equivalents which may be reasonably included within their scope.

What is claimed is:

1. In a control device, an operating shaft rotatable in opposite directions, condition responsive means for rotating said shaft, a hub member on said shaft, control operating means actuated by said shaft, manual means on the shaft for adjusting the control operating means, said adjusting means comprising an adjusting member coupled to the control operating means and having a hollow axial portion through which the shaft passes, and a holding member secured to the shaft and extending axially within the hollow portion of the adjusting member for manually holding said shaft from rotation while said adjusting member is being adjusted.

2. In a control device, an operating shaft rotatable in opposite directions, condition responsive means for rotating said shaft, a hub member on the shaft and rotatable therewith, a control operating member loosely mounted on the hub member, control means operated by the control operating member at a predetermined point in the rotation of said shaft, adjusting means loosely mounted on the hub member and coupled to said control operating member for varying the operating point of the control means, means for frictionally holding said control operating member and adjusting means on the hub member, said adjusting means comprising a hollow member through which the hub member axially extends, a holding member having a shank portion extending within the hollow adjusting member and axially engaging the hub member, said holding member having a transverse portion closing one end of the hollow adjusting member, and means for fastening the holding member and the hub member together upon the shaft whereby the holding member is adapted to be restrained to prevent rotation of the shaft while said adjusting member is being adjusted.

3. In a control device, an operating shaft rotatable in opposite directions, condition responsive means for rotating said shaft, a hub member on the shaft rotatable therewith, a control actuating member on the hub member, control means operated by the control actuating member at a predetermined point in the rotation of said shaft, adjusting means coupled to the control actuating member for varying the operating point of the control means, said adjusting means comprising a member having a hollow portion through which the hub member axially extends, a holding member having a shank portion axially engaging the hub member and extending within the hollow portion of said adjusting member, said holding member also having a transverse portion closing the opening of the hollow portion of the adjusting member, means for fastening the shank portion of the holding member and said hub member to said shaft whereby said holding member is adapted to restrain said shaft from rotating while said adjusting member is being adjusted, and cooperating indicating means on the transverse portion of the holding member and on the edge of the adjusting member for indicating the adjustment.

4. In a control device, a control operating means, means for adjusting the control point of the operating means, said adjusting means comprising a cup-shaped member having means for coupling the control operating means therewith, a holding member having a shank portion extending axially within said adjusting member and a transverse portion closing the opening in the adjusting member, said holding member adapted to be manually restrained from movement while said adjusting member is manually being adjusted, friction means between the control operating means and the holding member for normally coupling the same together, and means extending inside said cup-shaped adjusting member between the bottom wall thereof and the holding member shank for yieldingly holding said control operating means and said holding member in frictional engagement.

5. In a control device, a rotatable shaft, condition responsive means for rotating the shaft, control operating means actuated by the rotation of said rotatable shaft, means for manually adjusting the operating point of the control operating means, said adjusting means comprising an adjusting member and a cooperating holding member, both of said members being disposed axially one within the other upon said rotatable shaft and having portions accessible for manual manipulation, means for connecting the other of said members with said control operating means, and friction means arranged on the operating shaft between said adjusting member and said holding member whereby said control operating means is enabled to be adjusted by one of said members while the rotatable shaft is manually restrained from movement by the other of said members.

6. In a control device, an operating shaft rotatable in opposite directions, condition responsive means for rotating said shaft, a hub member axially disposed on said operating shaft, a pair of cam members, control means operated by said cam members, and means for adjusting said cam members to determine the operating control point of the control means, said adjusting means comprising a cup-shaped adjusting member rotatably positioned upon said hub member and having means thereon for coupling the cam member therewith, friction means arranged on the hub member between the cam member and the hub member, a holding member having a shank portion axially engaging the hub member and projecting within the cup-shaped adjusting member, means inside said cup-shaped adjusting member and extending between the bottom thereof and the shank portion of the holding member for yieldingly holding said cam members and said hub member in frictional engagement, said holding member having a disc-shaped portion enclosing the opening in said cup-shaped member, means inside the cup-shaped adjusting member for fastening the shank portion and the hub member together to the operating shaft, means on said holding member disc for manually restraining said holding member, and means on said adjusting member for manually rotating the same to make an adjustment while said holding member is being restrained.

7. In a control device, condition responsive means, control operating means actuated thereby, means for manually adjusting the operating point of the control operating means, said adjusting means comprising a member having a hollow portion and a shoulder formed inside said hollow portion, a holding member having a shank portion extending within the hollow portion of the adjusting member for fastening the holding member to the condition responsive means, said holding member having a transverse portion enclosing the hollow end of the adjusting member, cooperating stop means on the shoulder of said adjusting member and on the transverse portion of said holding member to limit the adjustment of the adjusting member to a predetermined range, and cooperating means on said shoulder and said transverse portion for locking the adjusting member in its adjusted setting.

8. In a control device, an operating shaft rotatable in opposite directions, condition responsive means for rotating said shaft, a hub member on the shaft rotatable therewith, a control operating member on the hub member, control means operated by the control operating member at a predetermined point in the rotation of said shaft, and manual adjusting means coupled to the control operating member for varying the operating point of the control means, said adjusting means comprising a member having a hollow portion through which said hub member axially extends, a holding member having a shank portion axially engaging the hub member and extending within the hollow portion of said adjusting member, said holding member also having a transverse portion closing the opening in the adjusting member, means for fastening the shank portion of the holding member and said hub member to said shaft whereby said holding member is adapted to restrain said shaft from rotation while said adjusting member is being adjusted, and cooperating stop means on the adjusting member and the holding member for limiting the adjusting range of the adjusting member.

9. In a control device having a base for supporting control mechanism and a cover for enclosing the same, an operating element extending transversely of the cover and moving to various positions in accordance with changes in a condition, a control member for actuating the control mechanism arranged within the cover and actuated by the operating element, and an adjusting member for adjusting the control point at which the control member actuates the control mechanism, said adjusting member arranged axially adjacent the end of the operating element and having a portion protruding through the cover whereby the same is accessible for manual manipulation, and a holding member on the end of the operating element extending axially from the adjusting member outside the cover whereby the same is manually accessible for restraining the operating element from movement while said adjusting member is being adjusted.

10. In a control device having a base for supporting control mechanism and a cover enclosing the same, a temperature operated element extending transversely of the cover, a control operating member arranged within the cover and upon the temperature operated element for actuating the control mechanism, an adjusting member on the temperature operated element for adjusting the control operating member to operate the control mechanism at any selected temperature value, said adjusting member having a portion protruding through the cover whereby the same is accessible for manually performing the temperature adjustments, a holding member on the temperature operated element arranged in front of the adjusting member outside the cover whereby the same is accessible for manually preventing actuation of the temperature operated element while a temperature adjustment is being made, cooperating indicia delineated on the adjusting member and the holding member outside the cover for indicating the temperature value at which the control mechanism is operated, and other indicia upon the cover cooperating with said first indicia for indicating the temperature value to which the temperature operated element is subjected at any time.

11. In a control device having a base for supporting control mechanism and a cover for enclosing the same, a rotatable shaft having a portion extending within the cover and another portion projecting transversely therefrom, condition responsive means for rotating said shaft, control operating means for actuating the control mechanism associated with the rotatable shaft and arranged within the cover, and means connected to the control operating means for adjusting the operating point of the control operating means, said adjusting means comprising an adjusting member axially disposed upon the rotatable shaft portion within the cover and having a portion protruding from the cover for manually manipulating the adjusting member, a holding member axially secured to the rotatable shaft and having a portion located outside of the cover, said holding member disposed axially upon the front of the adjusting member and arranged to manually restrain the rotatable shaft from rotation while an adjustment is being made by the adjusting member, and friction means arranged between said control operating means and the rotatable shaft to permit relative manual rotation between said adjusting member and said holding member while said adjustment is being made.

12. In a control device having a base for supporting control mechanism and a cover for enclosing the same, a rotatable shaft having a portion extending within the cover, and another portion projecting transversely therefrom,, condition responsive means for rotating said shaft, control operating means for actuating the control mechanism arranged within the cover and operated by the rotation of the rotatable shaft, and means for adjusting the operating point of the control operating means, said adjusting means comprising an adjusting member and a cooperating holding member both arranged axially upon said rotatable shaft within the cover and each having a portion protruding exteriorly of the cover whereby they are accessible for manual manipulation, means for connecting one of said members to the rotatable shaft, means for connecting the other of said members to said control operating means, and friction means disposed between said adjusting member and said holding member whereby one of said members is adapted to be manually engaged to prevent the rotation of the rotatable shaft while the other member is being adjusted to change the operating point of the control operating means.

13. In a control instrument, a base, a cover for said base, a pair of stationary contacts mounted on said base, a movable contact arm having a pair of movable contacts adapted to cooperate with said stationary contacts, an operating arm pivoted intermediate its ends, one end of said operating arm carrying said pair of movable contacts, a rotatable shaft having a portion extending within the cover and other portion projecting transversely therefrom, condition responsive means for rotating said shaft, operating means for operating the other end of said operating arm, said operating means being arranged within the cover and operated by rotation of said rotatable shaft, and means for adjusting the instrument, said adjusting means comprising an adjusting member and a cooperating holding member both arranged axially upon said rotatable shaft within the cover and each having a portion protruding exteriorly of the cover whereby they are accessible for manual manipulation, means for connecting one of said members to the rotatable shaft, means for connecting the other of said members to said operating means, and friction means disposed between said adjusting member and said holding member whereby one of said members is adapted to be manually engaged to prevent the rotation of the rotatable shaft while the other member is being adjusted to change the operating point of the operating means.

14. In a control device having a base for supporting control mechanism and a cover for enclosing the same, an operating element extending transversely of the cover and moving to various positions in accordance with changes in a condition, a control member for actuating the control mechanism arranged within the cover and actuated by the operating element, and an adjusting member for adjusting the control point at which the control member actuates the control mechanism, said adjusting member arranged axially adjacent the end of the operating element and having a portion protruding through the cover whereby the same is accessible for manual manipulation, and a holding member on the end of the operating element having at least a portion located outside the cover whereby the same is manually accessible for restraining the operating element from movement while said adjusting member is being adjusted.

15. In a control device having a base for supporting control mechanism and a cover for enclosing the same, a rotatable shaft having a portion extending within the cover, condition responsive means for rotating said shaft, control operating means for actuating the control mechanism arranged within the cover and operated by the rotation of the rotatable shaft, and means for adjusting the operating point of the control operating means, said adjusting means comprising an adjusting member and a cooperating holding member, one of said members being mounted on the shaft within the cover and having a portion protruding exteriorly of the cover whereby it is accessible for manual manipulation, the other of said members also being mounted on said shaft and having at least a portion exterior of the cover for manual manipulation, means for connecting one of said members to the rotatable shaft, means for connecting the other of said members to said control operating means, and adjustable means for transmitting motion from one of said members to the other.

16. In a control device having a base for supporting control mechanism and a cover for enclosing the same, a rotatable shaft having a portion extending within the cover, condition responsive means for rotating said shaft, control operating means for actuating the control mechanism arranged within the cover and operated by the rotation of the rotatable shaft, and means for adjusting the operating point of the control operating means, said adjusting means comprising an adjusting member and a cooperating holding member, one of said members being cup-shaped mounted axially on the shaft inside the cover and having its open end protruding exteriorly of the cover where it is accessible for manual manipulation, the other of said members also being mounted on the shaft and having a portion exterior of said cover adjacent the open end of the cup-shaped member and serving to close said open end, means for connecting one of said members to the rotatable shaft, means for connecting the other of said members to said control operating means, and adjustable means for transmitting motion from one of said members to the other.

HOMER E. MALONE.